(12) United States Patent
Hall et al.

(10) Patent No.: US 8,851,003 B2
(45) Date of Patent: Oct. 7, 2014

(54) SAILBOAT HALYARD LOCK

(75) Inventors: Eric R. D. Hall, Bristol, RI (US);
Norman Reno, Providence, RI (US)

(73) Assignee: Hall Inc., Bristol, RI (US)

( * ) Notice: Subject to any disclaimer, the term of this patent is extended or adjusted under 35 U.S.C. 154(b) by 415 days.

(21) Appl. No.: 13/129,464

(22) PCT Filed: Nov. 17, 2009

(86) PCT No.: PCT/US2009/064753
§ 371 (c)(1),
(2), (4) Date: Aug. 15, 2011

(87) PCT Pub. No.: WO2010/057168
PCT Pub. Date: May 20, 2010

(65) Prior Publication Data
US 2011/0283928 A1 Nov. 24, 2011

Related U.S. Application Data

(60) Provisional application No. 61/115,445, filed on Nov. 17, 2008.

(51) Int. Cl.
| B63H 9/10 | (2006.01) |
| B63B 21/08 | (2006.01) |
| F16G 11/04 | (2006.01) |
| F16G 11/10 | (2006.01) |

(52) U.S. Cl.
CPC *F16G 11/04* (2013.01); *B63H 9/10* (2013.01); *B63B 21/08* (2013.01); *F16G 11/10* (2013.01)
USPC .......................................................... 114/218

(58) Field of Classification Search
CPC ...... B63B 21/04; B63B 21/045; B63B 15/00; B63B 21/08; B63B 21/00; B63H 9/04; B63H 9/08; B63H 9/10
USPC ............ 114/108, 218; 403/321, 322.1, 322.2, 403/322.3, 322.4, 325; 24/611
See application file for complete search history.

(56) References Cited

U.S. PATENT DOCUMENTS

| 3,040,690 | A | * | 6/1962 | Hensel ........................... 114/108 |
| 3,938,460 | A | | 2/1976 | Wales et al. |
| 4,077,347 | A | * | 3/1978 | Arce ............................. 114/108 |

(Continued)

OTHER PUBLICATIONS

International Search Report for International Application PCT/US2009/064753 dated Jan. 17, 2013.

(Continued)

*Primary Examiner* — Lars A Olson
*Assistant Examiner* — Anthony Wiest
(74) *Attorney, Agent, or Firm* — Edwards Wildman Palmer LLP; Steven M. Jensen

(57) ABSTRACT

A sailboat halyard lock includes a latch that interacts with a stop to maintain tension on a halyard, and a spring-loaded trigger that contacts the latch. The stop can be a ball that moves along a path through the halyard lock, or alternatively, a wall of a sail track. The latch rotates to engage the stop in the locked position, and is released to return to a neutral position. A spring-loaded trigger contacts the latch so as to position the latch to receive the ball or wall in the locked position. In this way, the halyard can be maintained under tension in the halyard lock, and the tension is adjustable over time.

20 Claims, 11 Drawing Sheets

(56) References Cited

U.S. PATENT DOCUMENTS

| | | | |
|---|---|---|---|
| 4,465,011 A | 8/1984 | Merry | |
| 4,644,617 A | 2/1987 | Tupper et al. | |
| 4,719,869 A * | 1/1988 | Harken et al. | 114/102.19 |
| 5,167,198 A | 12/1992 | Bonnet | |
| 6,443,082 B1 | 9/2002 | Lindstrom et al. | |

OTHER PUBLICATIONS

International Preliminary Report on Patentability for International Application PCT/US2009/064753 dated Jan. 22, 2013.

* cited by examiner

SAILBOAT HALYARD LOCK

CROSS-REFERENCE TO RELATED APPLICATION

This application claims the benefit of application U.S. Provisional Application Ser. No. 61/115,445 filed on Nov. 17, 2008, the disclosure of which is expressly incorporated herein by reference in its entirety.

FIELD OF INVENTION

The subject invention relates to a halyard lock for use on a sailboat.

BACKGROUND OF THE INVENTION

Sailboat sails are hoisted by ropes called halyards. Conventionally, halyards were made of steel cable, for example, stainless steel, galvanized plow steel, or the like. These steel halyards generally were strong and had little or no stretch/strain over time. With the advent of high strength synthetic polymer fibers, such as Dyneema/Spectra, Vectran, or PBO (poly-p-phenylenebenzobisoxazole), halyards weighing about 25% of the weight of steel halyards with equal strength and stretch of steel halyards were developed. Today, these lightweight high strength ropes make up almost all of sailboat halyards.

Synthetic-based halyards, however, typically suffer from a disadvantage of "creep," which is not found in steel halyards. Creep is the property of a material whereby it gradually strains and elongates under constant load. When a halyard slowly strains, the tension in the halyard decreases and sail trim is affected, such that the halyard must be regularly readjusted to maintain optimal sail trim. Especially on racing boats, consistent and accurate halyard tension is an important property. For non-racing boats, the slowly straining halyards can cause the sail to slowly develop wrinkles as tension eases, making for an unsightly sail, which can compromise the perceived beauty of a sailing pleasure yacht.

To combat this problem, halyard locks are regularly installed at the top of masts, so that creep can be avoided. Traditionally a halyard lock includes a hook that latches to a ball-like fitting on the halyard. This latch generally latches like a door latch. To unlock the lock, the sail is tensioned to relieve the load on the lock. Then, at deck level, a small diameter rope or "tripline" that runs either inside the mast or outside along the sail and attached to the latch is tensioned, releasing the sail. Since the masthead is typically too tall to be visible from the deck level, it is sometimes difficult to determine if the lock is locked, partially locked, or not locked at all. Often a crew member is sent aloft to confirm that the halyard is locked. Also, the use of multiple triplines can be problematic, for example, they can jam inside the mast, break, or make lock servicing difficult, and may require an additional crew member to operate.

It would therefore be desirable to provide a halyard lock that does not require a tripline. It would also be desirable to provide a halyard lock that allows a single crew member to raise and lock a halyard hoisting a sail and to unlock and lower the same.

SUMMARY OF THE INVENTION

Sailboat halyard locks, and methods of tensioning a halyard are provided. Sailboat halyard locks according to the subject invention preferably operate without an attendant tripline. Halyard locks according to the subject invention can eliminate the need for manual inspection to determine if the lock is locked. To lock a halyard, the halyard preferably is hoisted against an end stop, thereby enabling the halyard to engage the lock. To release the halyard from a locked condition, the halyard is again hoisted against its stop to release tension. According to this mechanism, the sailboat halyard lock of the subject invention is configured to automatically unlock.

A sailboat halyard lock according to the subject invention preferably includes a latch that interacts with a stop to maintain tension on the halyard, and a spring-loaded trigger that contacts the latch. In a first embodiment, the stop is a ball that moves along a path through the halyard lock. According to a second embodiment, the stop is a wall or a portion of the wall along a sail track. The latch rotates to engage the stop in the locked position, and is released by opposite-acting rotational springs. A spring-loaded trigger engages a cam of the latch so as to "cock" the latch and position the latch to receive the ball and/or the wall. In this way, the halyard can be maintained under tension in the halyard lock, and the tension is adjustable over time.

A halyard lock for maintaining tension on a halyard, can include: the halyard lock configured to receive a ball that moves along a path through the halyard lock, the ball being operably connected to the halyard; a latch rotatably disposed in the halyard lock, the latch configured to rotate between at least an engaged position in which the latch allows movement of the ball, and a locked position in which at least a surface of the latch receives the ball and impedes the ball from further movement, such that the halyard is tensioned in the locked position; and a spring-loaded trigger configured to contact the latch and position the latch for receiving the ball in the locked position.

Preferably the latch includes a cam for engaging the trigger, where the trigger engages the cam and rotates the latch so as to receive the ball in the locked position. Further, upon releasing the latch from the locked position, the latch rotates to a neutral position by virtue of its opposite-acting rotational springs.

Alternatively, a halyard lock is provided for maintaining tension on a halyard, the halyard lock being provided in a track car arranged with respect to a sail track, including: the track car being displaceable along the sail track; a latch configured to rotate between at least an engaged position in which the track car moves with respect to the sail track, and a locked position in which at least a surface of the latch engages a wall of the sail track and impedes the track car from further movement, such that the halyard is tensioned in the locked position; and a spring-loaded trigger configured to rotate with respect to the latch and position the latch for receiving the ball in the locked position.

A method for maintaining tension on a halyard can includes steps of: providing a halyard lock including at least a latch rotatably disposed in the halyard lock, and a spring-loaded trigger configured to contact the latch; moving a ball along a path through the halyard lock, the ball being operably connected to the halyard; receiving the ball in the latch, the ball being impeded from further movement, such that the halyard is tensioned in a locked position; and releasing the latch from the locked position.

Alternatively, a method for maintaining tension on a halyard, can include steps of: providing a halyard lock in a track car displaceable along a sail track; disposing the latch in an engaged position in which the track car moves with respect to the sail track, and moving the track car into a locked position in which at least a surface of the latch engages a wall of the sail track and impedes the track car from further movement, such that the halyard is tensioned in the locked position; and releasing the latch from the locked position.

BRIEF DESCRIPTION OF THE DRAWINGS

For a fuller understanding of the nature and desired objects of the present invention, reference is made to the following detailed description taken in conjunction with the accompanying drawing figures wherein like reference character denote corresponding parts throughout the several views and wherein.

DETAILED DESCRIPTION OF THE INVENTION

Sailboat halyard locks and methods of tensioning a halyard are provided. In particular, sailboat halyard locks according to the subject invention preferably operate without an attendant tripline. The halyard locks can eliminate the need for manual inspection to determine if the lock is locked. To lock a halyard, the halyard preferably is hoisted against an end stop, thereby enabling the halyard to engage the lock. To release the halyard from a locked condition, the halyard is again hoisted against its stop to release tension. According to this mechanism, the sailboat halyard lock of the subject invention is configured to automatically unlock.

FIGS. 1-6 depict a halyard lock according to a first embodiment of the subject invention, where the halyard lock can maintain tension on a halyard hoisting a headsail, for example, a jib or spinnaker.

Figure 1:
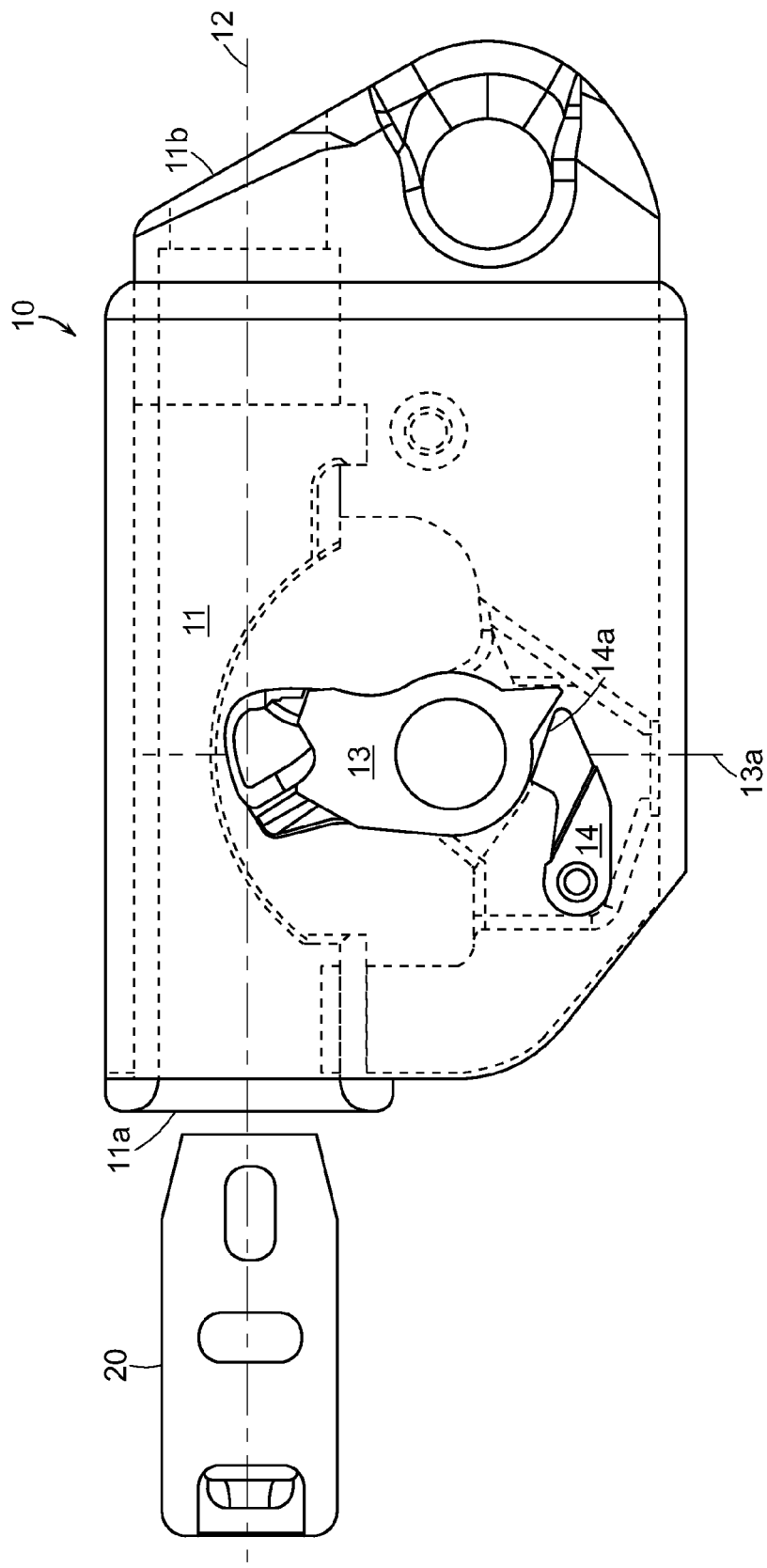
FIG. 1 is a cross-sectional view of a halyard lock in a "neutral" position according to a first embodiment of the subject invention.

FIG. 1 depicts a cross-sectional view of a halyard lock 10 in a "neutral" position according to a first embodiment. The halyard lock 10 preferably is formed with an internal space 11 that includes a first opening 11a for allowing a ball 20 to enter the internal space 11 along a path 12. The ball 20 moves along the path 12 in a first direction (from left to right in FIG. 1) when the halyard is tensioned to raise a sail. The ball 20 is removably attached to a halyard hoisting a sail (not shown) at a predetermined location along the halyard. Inside the internal space 11, the halyard lock further includes a latch 13 that is rotatably disposed to protrude into the path 12 by virtue of a spring mechanism, preferably two opposite-acting rotational springs. The latch 13 preferably is supported by a first surface 14a of a trigger 14 in a "neutral" position such that an axis 13a of the latch 13 is substantially perpendicular to the path 12. The trigger 14 preferably is spring-loaded and biased toward the latch 13.

Figure 2:
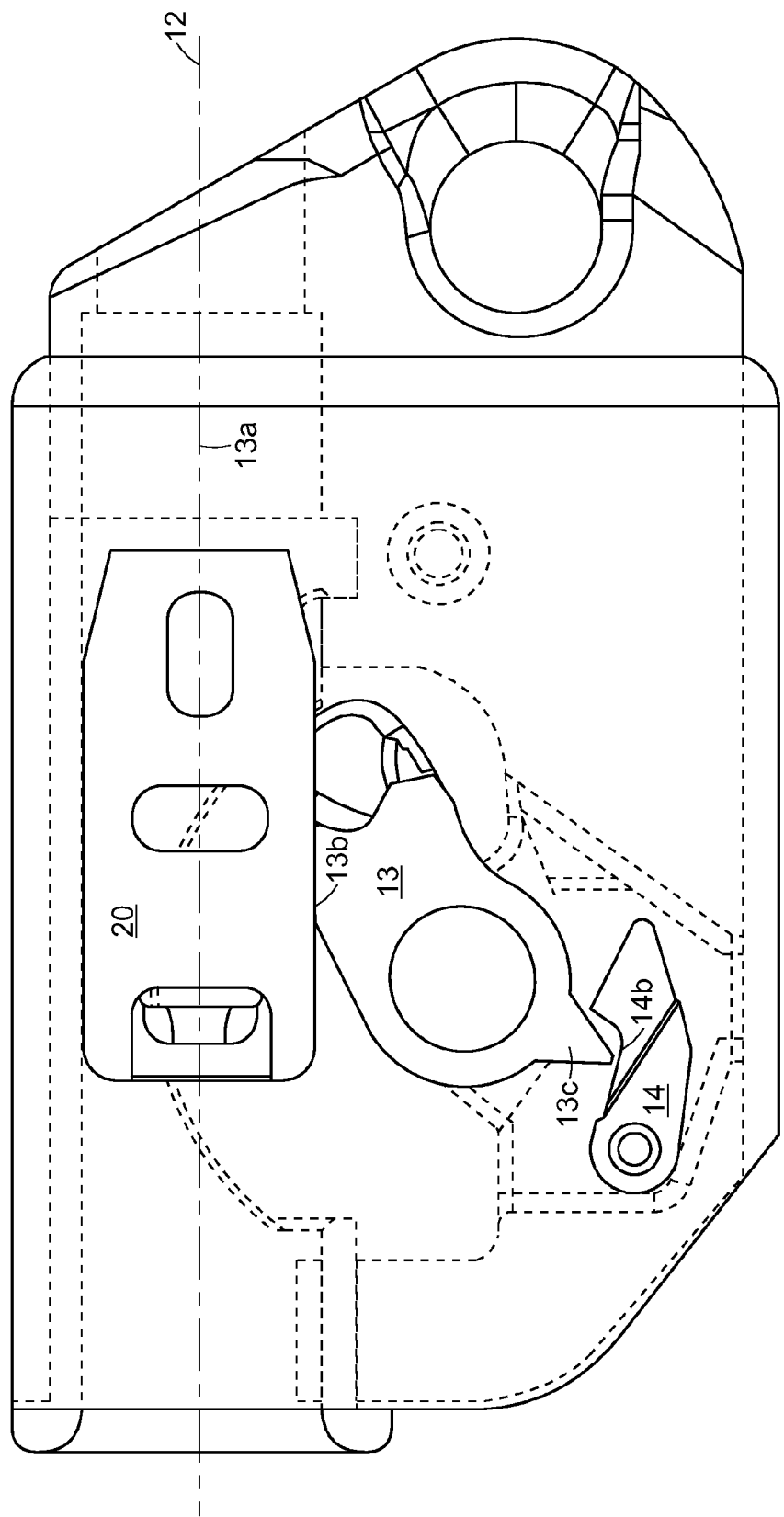
FIG. 2 is a cross-sectional view of the halyard lock of FIG. 1 in an "engaged" position.

FIG. 2 depicts a cross-sectional view of the halyard lock 10 in an "engaged" position according to the first embodiment. When the ball 20 enters the internal space 11 along the path 12, it engages the latch 13 along a surface 13b of the latch 13 such that the axis 13a of the latch 13 is rotated and a cam 13c of the latch 13 is engaged with the trigger 14 on a second surface 14b.

Figure 3:
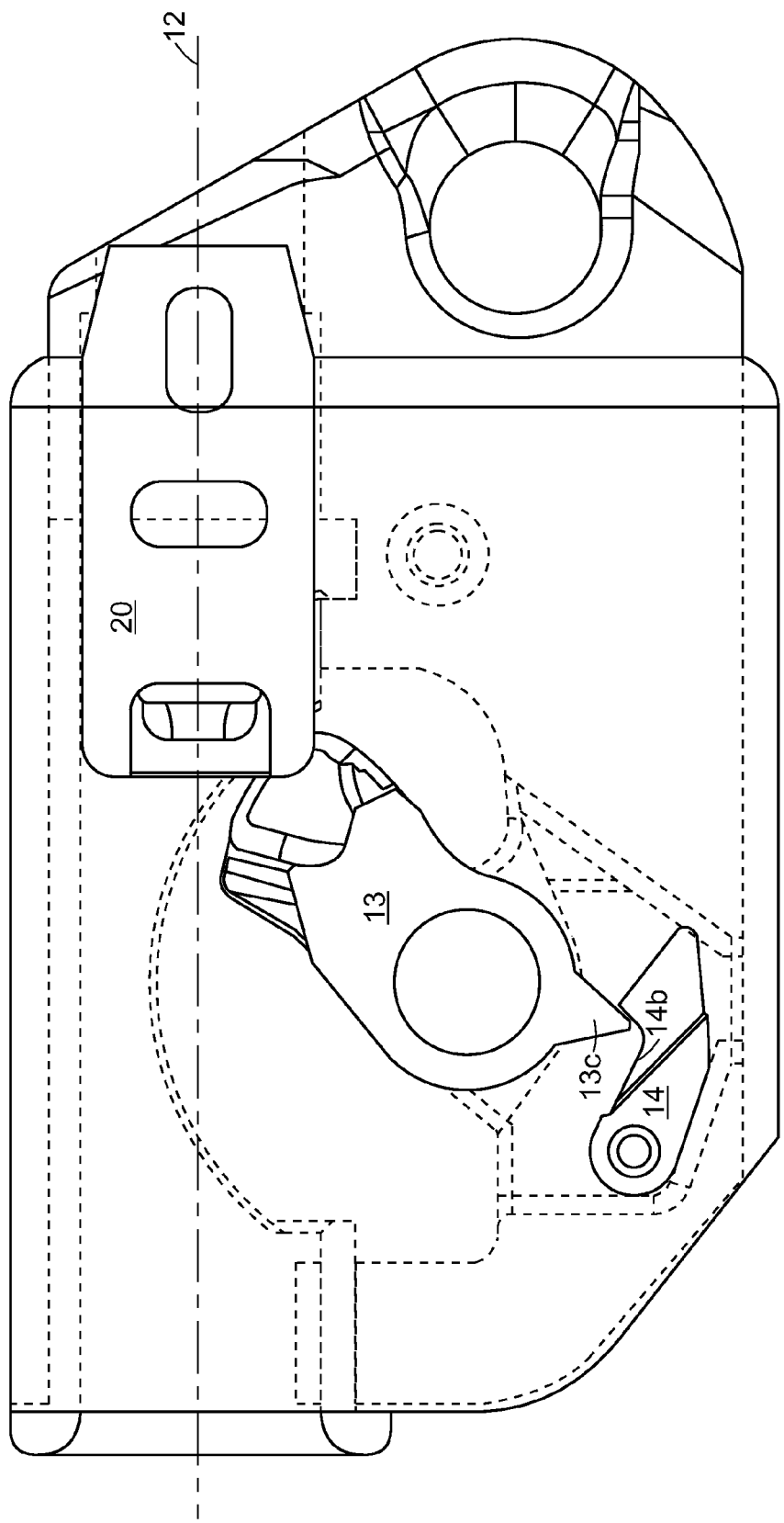
FIG. 3 is a cross-sectional view of the halyard lock of FIG. 1 in a "cocked" position.

FIG. 3 depicts a cross-sectional view of the halyard lock in a "cocked" position according to the first embodiment. As the ball 20 moves pass the latch 13 along the path 12, the trigger 14 prevents the latch 13 from rotating back to its neutral position by impeding the cam 13c of the latch 13 with the second surface 14b. Also, the spring-loaded trigger 14 tends to push the latch 13 to rotate in a counterclockwise direction so as to protrude into the path 12. In other words, the latch 13 is "cocked" to receive and to subsequently impede the ball 20 from moving back along the path 12 (from right to left in FIG. 3).

Figure 4:
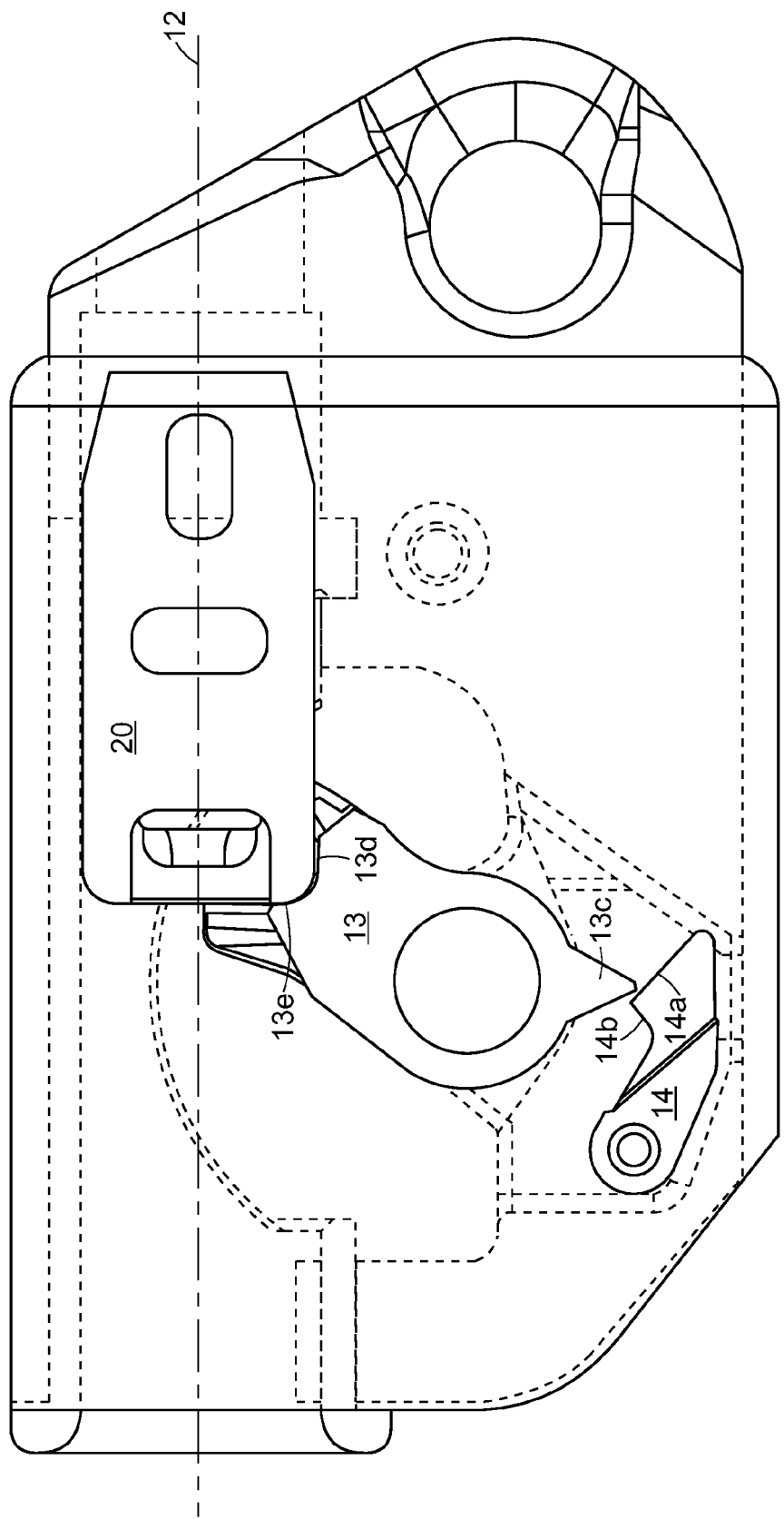
FIG. 4 is a cross-sectional view of the halyard lock of FIG. 1 in a "locked" position.

FIG. 4 depicts a cross-sectional view of the halyard lock in a "locked" position according to the first embodiment. As the ball 20 moves in a second direction along the path 12 (from right to left in FIG. 4), surfaces 13d and 13e of the latch 13 preferably engage with the ball 20 and combine with a surface above the ball 20 to impede the ball 20 from moving further in the second direction along the path 12. Preferably, the surfaces 13d and 13e are shaped in a complimentary manner with respect to corresponding surfaces of the ball 20, such that the ball 20 can be substantially held by the latch 13 in the locked position depicted in FIG. 4. At the same time, the cam 13c of the latch 13 moves from being engaged with the trigger 14 on the surface 14b to being engaged with the trigger 14 on the surface 14a. The load of the sail tensions the halyard and the ball to move in the second direction (from right to left) on the path 12. The ball 20 is impeded from moving further on the path 12 because the ball 20 exerts a force on the surface 13e of the latch 13. This force tends to rotate the latch 13 back to its neutral position in FIG. 1. At the same time, rotation of the latch 13 translates the force the ball 20 exerts on the surface 13e into a force exerted by the surface 13d of the latch on the ball 20 and in a direction perpendicular to the path 12. The compressive force against the ball 20 resists the tension load on the halyard, and the ball 20 "seats" into the latch 13. The normal downward tension of the halyard "uncocks" the latch 13 to allow the latch 13 to lock the halyard. Since the ball 20 is removably attached to the halyard, the tension on the halyard can be adjusted over time as the halyard strains.

Figure 5:
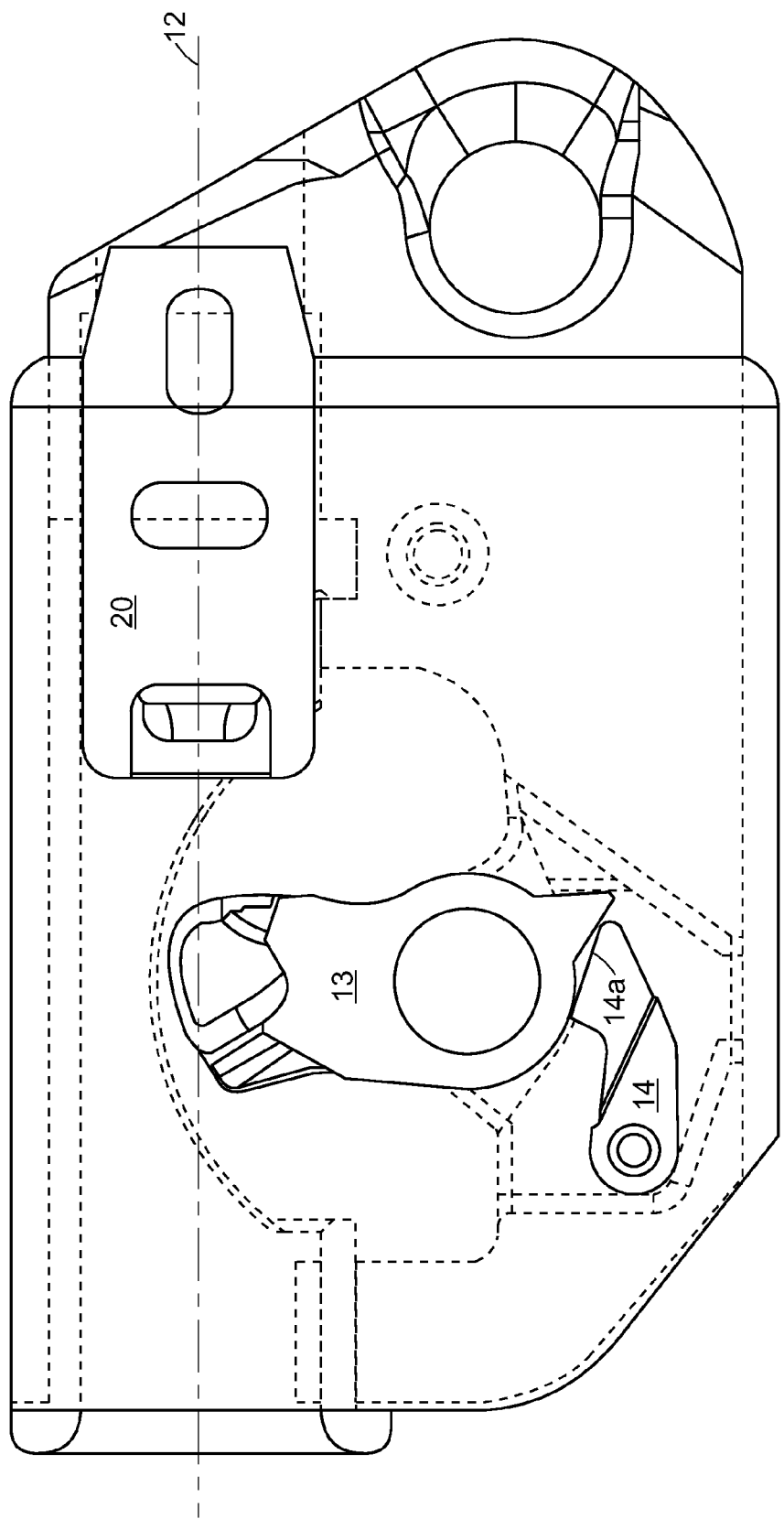
FIG. 5 is a cross-sectional view of the halyard lock of FIG. 1 in a "release" position.

FIG. 5 depicts a cross-sectional view of the halyard lock in a "release" position according to the first embodiment. To release the ball 20 and the halyard, the halyard is tensioned to pull the ball 20 to move in a first direction along the path 12 (from left to right) so as to disengage with the latch 13. In this position, the dual rotational spring-loaded latch 13 is no longer impeded by the trigger, and the latch 13 is moved to its neutral position by the opposite-acting rotational springs. In other words, the rotational springs of the latch 13 force the latch 13 back to the neutral position. After the latch 13 has been "released," the cam 13c of the latch 13 is supported by the surface 14a of the trigger 14.

Figure 6:
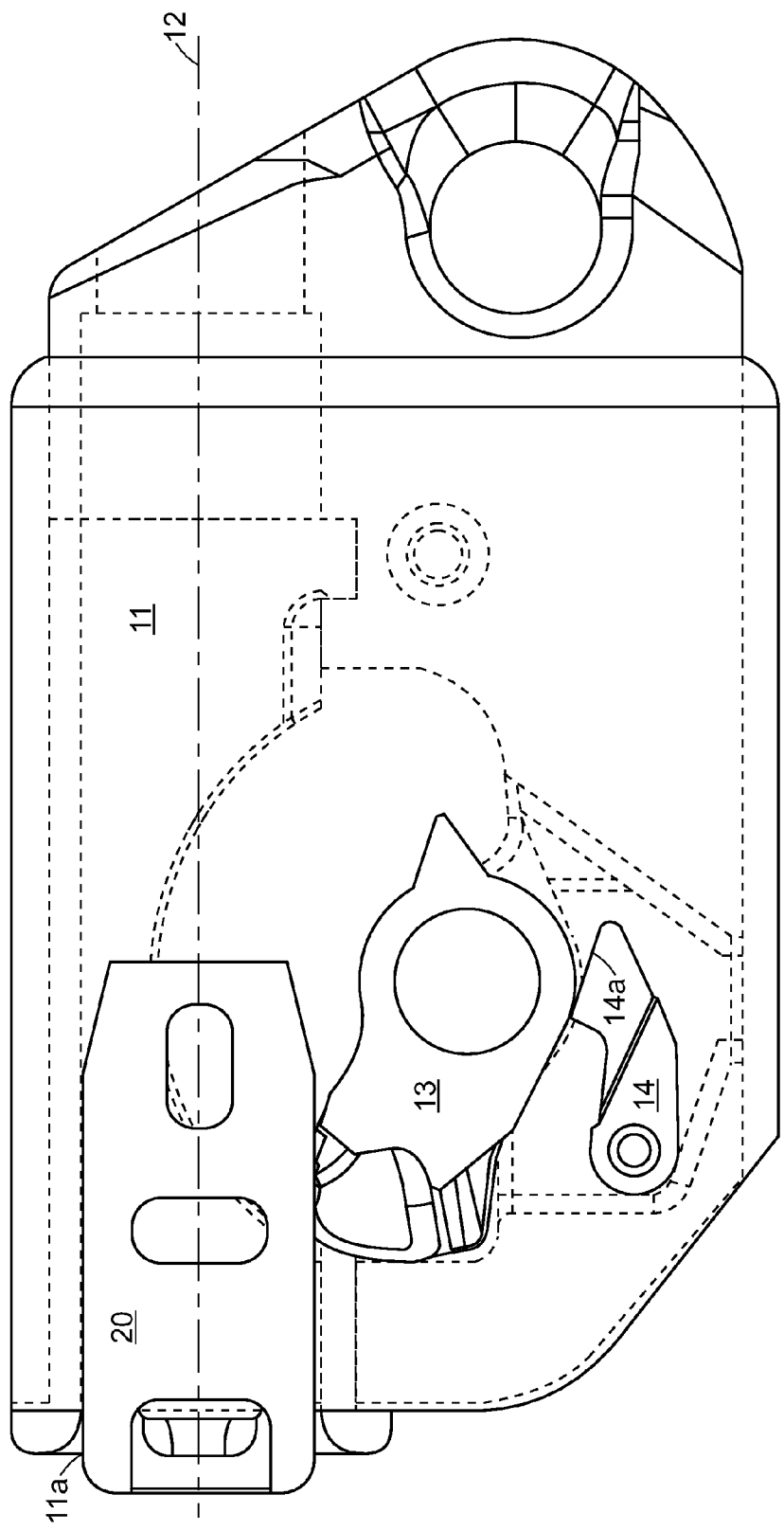
FIG. 6 is a cross-sectional view of the halyard lock of FIG. 1 in an "unlocked" position.

FIG. 6 depicts a cross-sectional view of the halyard lock in a "unlocked" position according to the first embodiment. In this view, the tension on the halyard to move ball 20 in FIG. 5 to release the trigger 13 has been eased and the tension load of the sail on the halyard tensions the halyard to move the ball in the second direction (from right to left) along the path 12. Since the latch 13 is no longer impeded by trigger 14, the latch 13 rotates counter-clockwise from the neutral position to allow the ball 20 to exit the interior space 11 via the opening 11a.

It should be appreciated that a second latch and trigger set may be disposed opposite the first latch 13 and trigger 14 set to provide a complementary locking mechanism along the path 12.

FIGS. 7-11 depict a halyard lock 50 according to a second embodiment that may be adapted for maintaining tension or trim on a halyard hoisting a sail on a sail track, for example, in the case of a track mounted mainsail. The halyard lock 50 can lock and unlock a tracked car that holds a mainsail to the back side of the mast.

Figure 7:
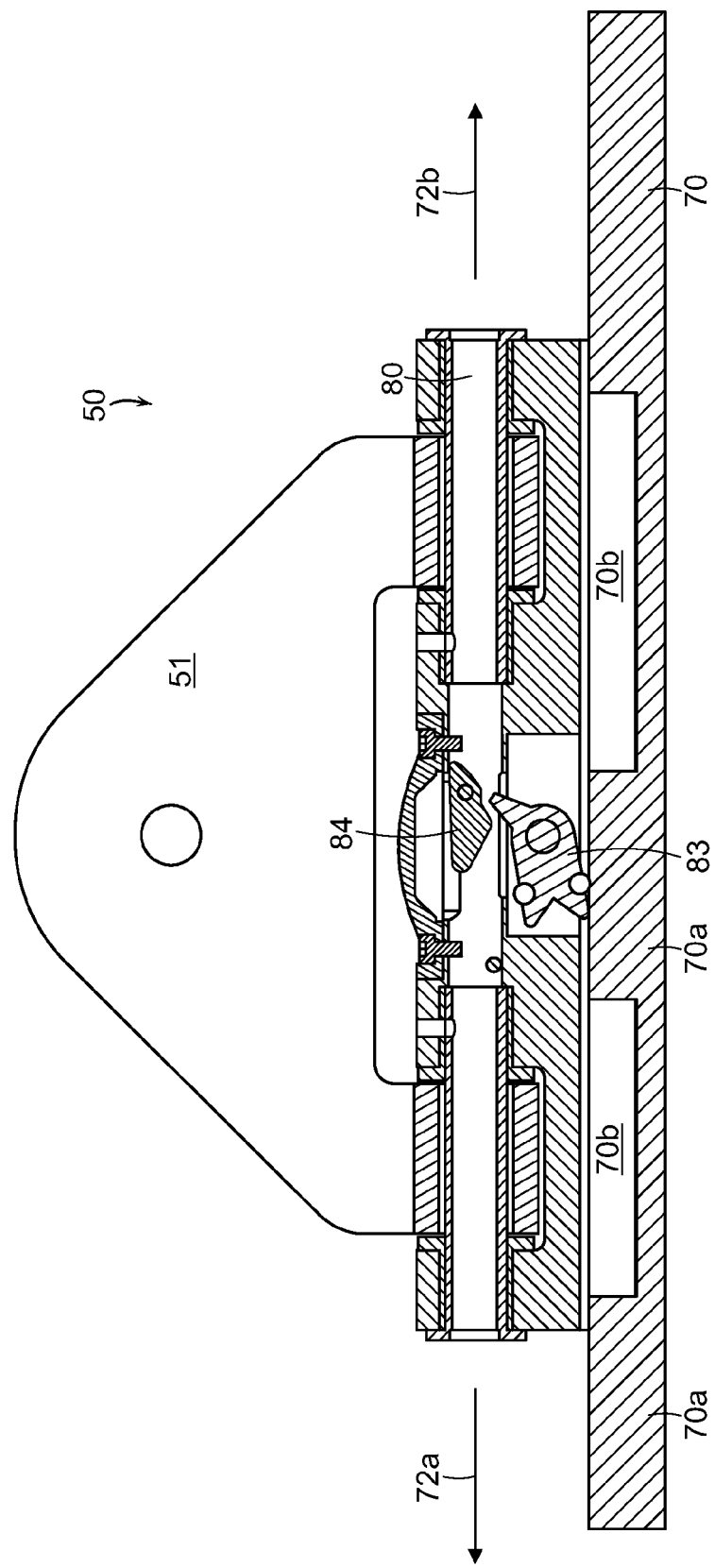
FIG. 7 is a cross-sectional view of a halyard lock in an "engaged" position according to a second embodiment of the subject invention.

FIG. 7 is a cross-sectional view of a halyard lock 50 in an "engaged" position according to a second embodiment. In this view a sail track 70 allows a track car 80 to move in first and second directions denoted by reference numbers 72a and 72b, respectively. The track car 80 preferably includes a panel 51 that is attached to a main sail headboard. The track car 80 further includes a latch 83 and a trigger 84 disposed inside the track car and over the track 70. The track 70 preferably one or more cavities 70b disposed in between solid sections 70a. As shown in FIG. 7, the latch 83 is supported on a solid section 70a of the track 70.

Figure 8:
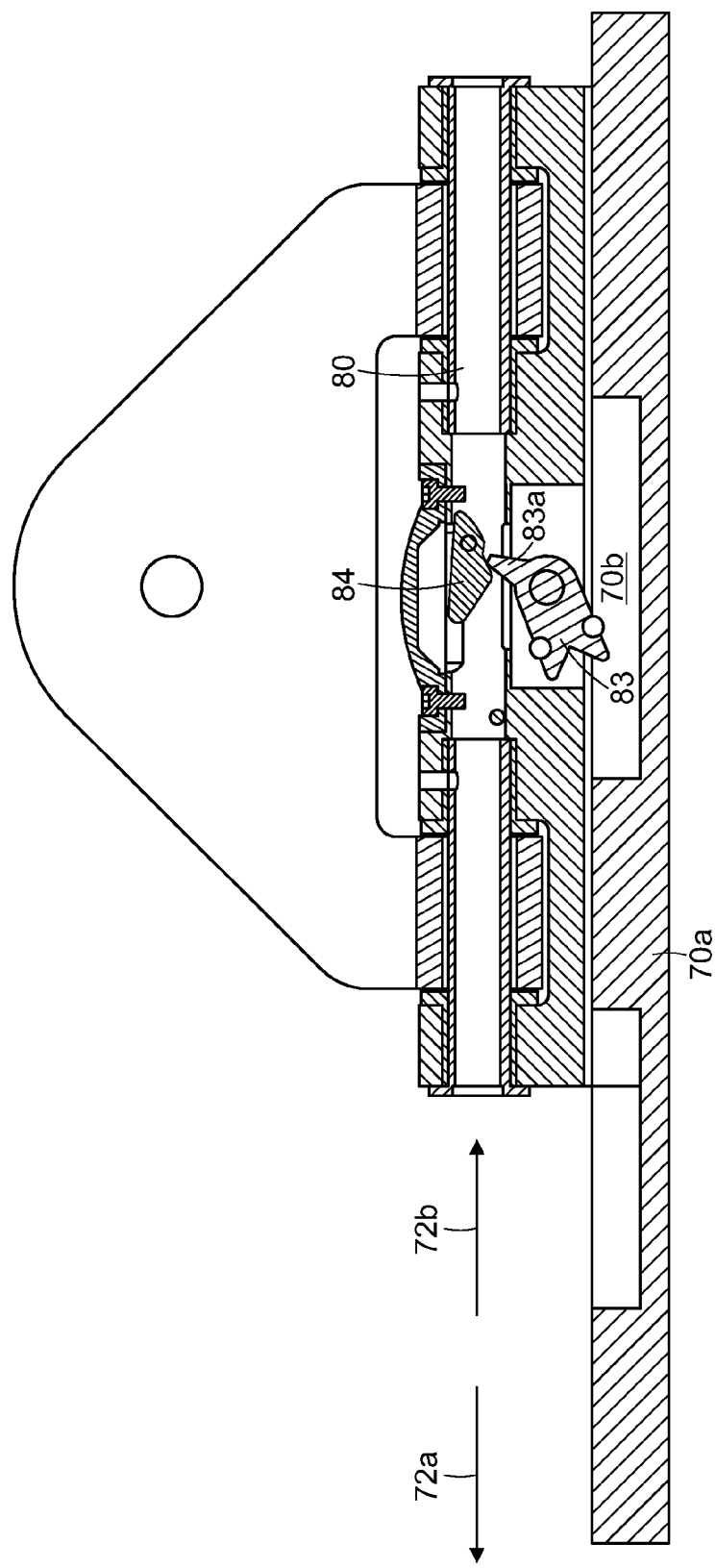
FIG. 8 is a cross-sectional view of the halyard lock of FIG. 7 in a "cocked" position.

FIG. 8 is a cross-sectional view of the halyard lock 50 in a "cocked" position according to the second embodiment. The track car 80 is pulled by a halyard to move in the second direction 72b upwards a mast such that the latch 83 has moved past the solid sections 70a of the track 70. As the latch 83 moves over the cavity 70b of the track 70, the latch 73 is rotated to rotate to protrude into the cavity. A cam 83a of the latch 83 engages the trigger 84 such that the latch 83 is impeded to rotate further. In this configuration, the latch 83 is said to be "cocked."

Figure 9:
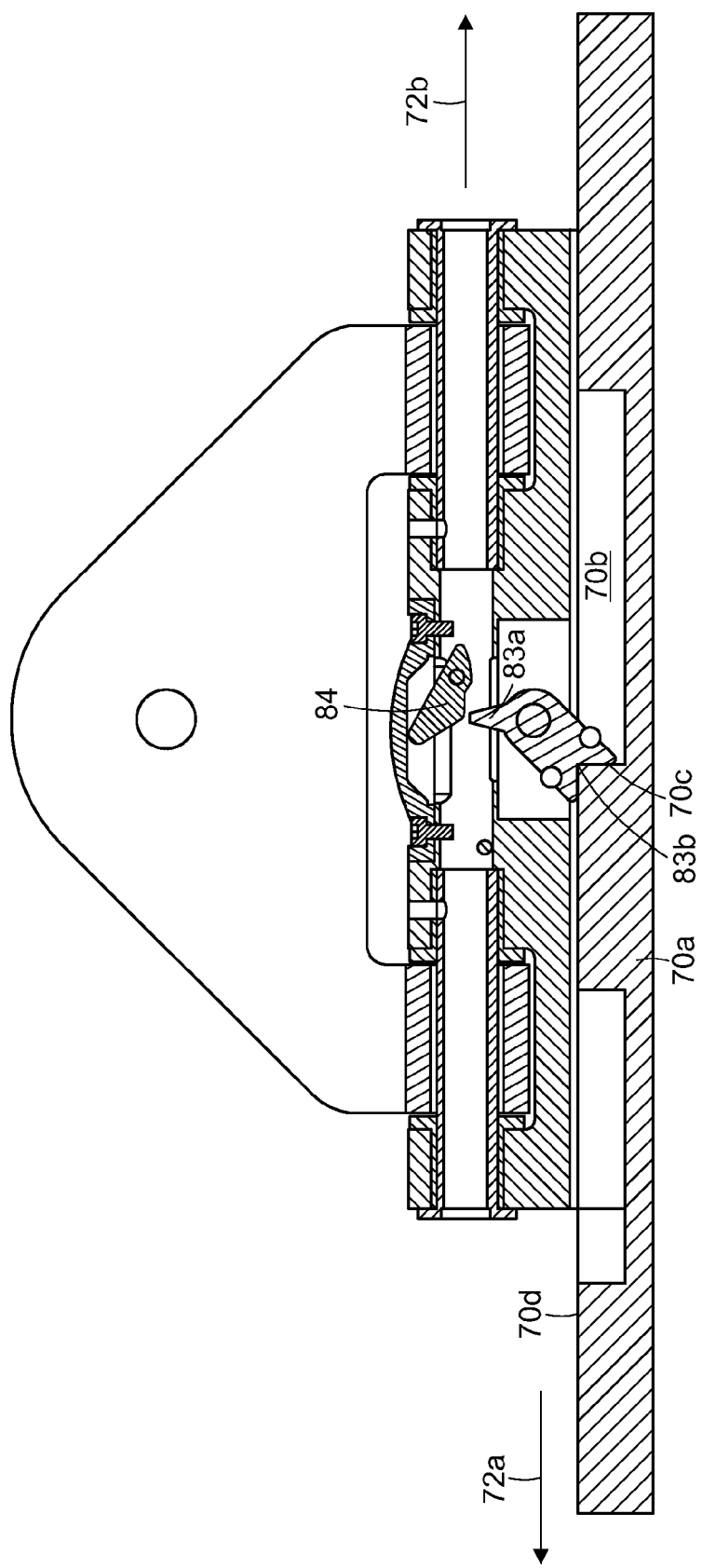
FIG. 9 is a cross-sectional view of the halyard lock of FIG. 7 in a "locked" position.

FIG. 9 is a cross-sectional view of the halyard lock in a "locked" position according to the second embodiment. As shown in FIG. 9, the cavity 70b has a wall 70c that is perpendicular to the track 70. As the tension on the halyard that pulled the track car 80 in the second direction is eased, the track car 80 is moved in the first direction 72a. As the track car moves in the first direction 72a, a dovetail portion 83b of the latch 83 engages the wall 70c in the cavity 70b of the track 70. The cam 83a of the latch 83 pushes the trigger 84 to rotate away from the latch 83 such that the latch 83 is no longer impeded by the trigger 84. As the dovetail portion 83b engages the wall 70c of the cavity 70b, the load on the halyard tends to rotate the latch 83 counterclockwise. Since the dovetail portion 83b has a first surface that engages the cavity wall 70c and a second surface engages the track surface 70d over the solid portion of the track 70a, the force of the load is translated into a force on the second surface of the dovetail portion in a direction perpendicular to the track 70. Consequently, the track car is locked in position.

Figure 10:
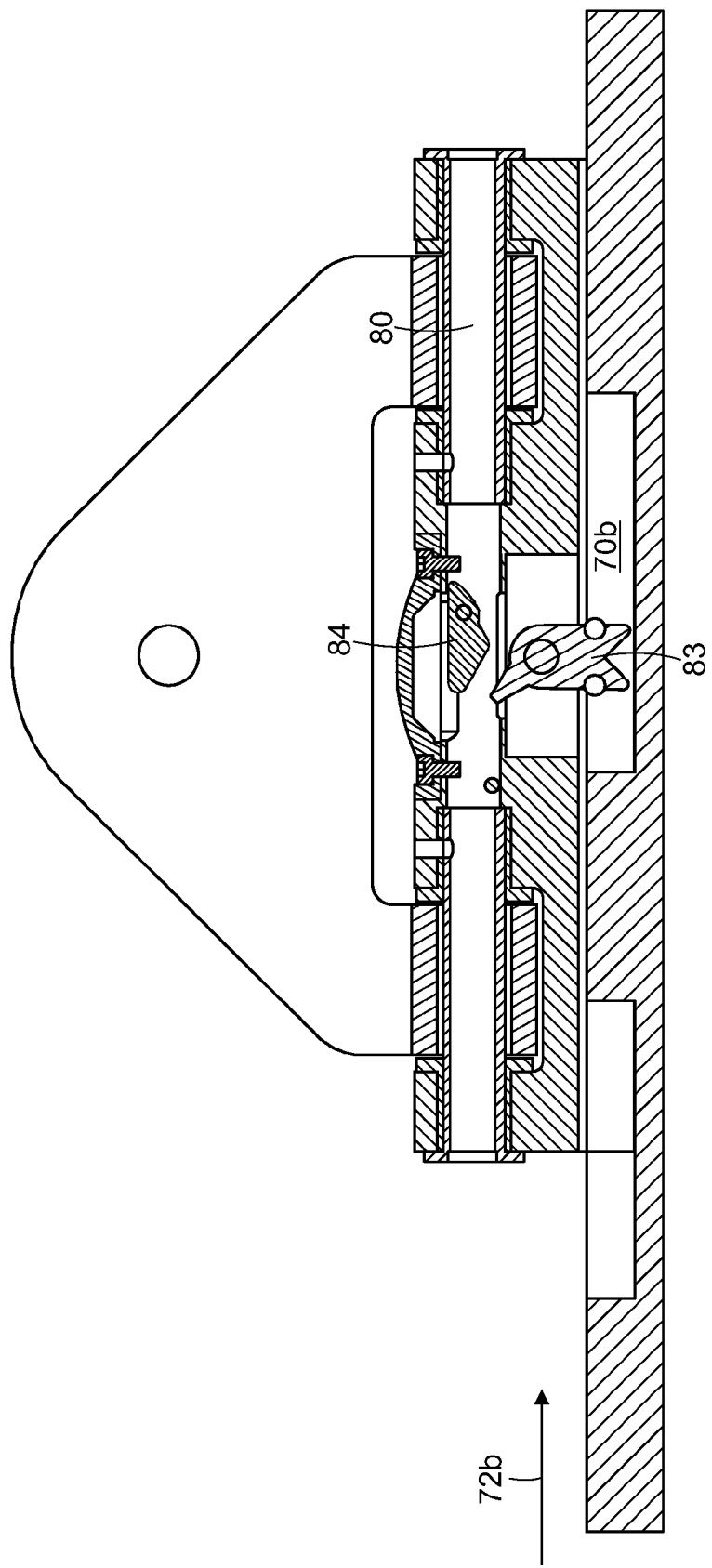
FIG. 10 is a cross-sectional view of the halyard lock of FIG. 7 in a "release" position.

FIG. 10 is a cross-sectional view of the halyard lock in a "release" position according to the second embodiment. To release the track car from being locked in position, a tension is applied to the halyard connected to the track car 80 that pulls the track car in a second direction 72b. The latch 83 rotates to a "neutral" orientation and protrudes into the cavity 70b.

Figure 11:
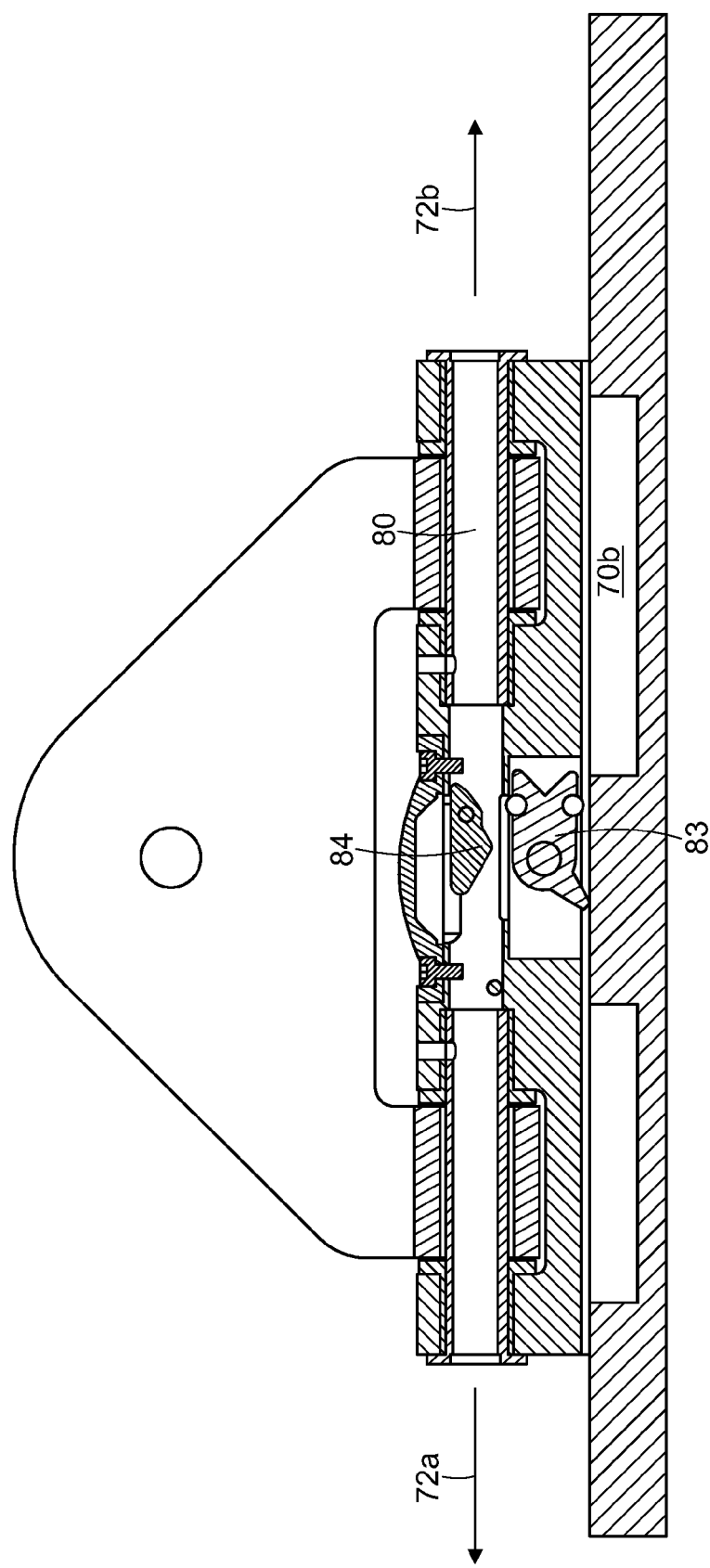
FIG. 11 is a cross-sectional view of the halyard lock of FIG. 7 in an "unlocked" position.

FIG. 11 is a cross-sectional view of the halyard lock in a "unlocked" position according to the second embodiment. Finally, the tension that was applied to pull the track car in the second direction 72b is eased. Since the latch 83 is unimpeded from rotating further in a counterclockwise direction, the portion of the latch 83 that protruded into the cavity 70b simply rotates out of the cavity, thereby allowing the track car to move freely in the first direction 72a down the mast.

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications and other references cited herein are hereby expressly incorporated herein in their entireties by reference.

What is claimed is:

1. A halyard lock for maintaining tension on a halyard, comprising:
   a housing having an internal space and configured to receive a ball that moves along a path through the housing, the ball being operably connected to the halyard;
   a latch rotatably disposed in the housing, the latch configured to rotate between at least an engaged position in which the latch allows movement of the ball, and a locked position in which at least a surface of the latch receives the ball and impedes the ball from further movement, such that the halyard is tensioned in the locked position; and
   a spring-loaded trigger independently rotatably disposed within the housing and having at least first and second surfaces arranged on different sides of the trigger, the second surface of the trigger configured to contact the latch in the engaged position, and the first surface configured to contact the latch and position the latch for receiving the ball in the locked position.

2. The halyard lock of claim 1, wherein in a neutral position before receiving the ball, the latch protrudes into the path.

3. The halyard lock of claim 1, wherein in the engaged position, a surface of the latch engages the ball during movement of the ball along the path.

4. The halyard lock of claim 1, wherein the at least one surface of the latch that locks the ball in the locked position comprises a plurality of complimentary surfaces.

5. The halyard lock of claim 1, wherein the latch includes a cam for engaging the trigger.

6. The halyard lock of claim 5, wherein the trigger engages the cam and rotates the latch so as to arrange the latch to receive the ball in the locked position.

7. The halyard lock of claim 6, wherein upon releasing the latch from the locked position, the latch is biased to a neutral position.

8. The halyard lock of claim 1, wherein the ball is removably attached to the halyard, such that the tension on the halyard is adjustable.

9. The halyard lock of claim 1, wherein the halyard hoists a headsail.

10. The halyard lock of claim 1, wherein the halyard lock operates without a tripline.

11. A halyard lock for maintaining tension on a halyard, the halyard lock being provided in a track car arranged with respect to a sail track, comprising:
   the track car being displaceable along the sail track;
   a latch configured to rotate between at least an engaged position in which the track car moves with respect to the sail track, and a locked position in which at least a surface of the latch engages a wall of the sail track and impedes the track car from further movement, such that the halyard is tensioned in the locked position; and a sprig-loaded trigger independently rotatably disposed inside the track car and having at least first and second surfaces arranged on different sides of the trigger, the second surface of the trigger configured to contact the latch in the engaged position, and the first surface configured to contact the latch and rotate with respect to the latch and position the latch for engaging the sail track in the locked position.

12. The halyard lock of claim 11, wherein the latch includes a cam for engaging the trigger.

13. The halyard lock of claim 12, wherein the trigger engages the cam and rotates the latch so as to force the latch into engagement with the wall.

14. The halyard lock of claim 13, wherein upon disengaging the latch from the locked position, the latch is biased to a neutral position.

15. The halyard lock of claim 11, wherein the track car includes a panel configured to be attached to a main sail headboard.

16. The halyard lock of claim 11, wherein the halyard tows a sail on the sail track.

17. A method for maintaining tension on a halyard, comprising the steps of:

providing a halyard lock including at least a latch rotatably disposed in a housing of the halyard lock, and a spring-loaded trigger independently rotatably disposed within the housing and having at least first and second surfaces arranged on different sides of the trigger, the second surface of the trigger configured to contact the latch in an engaged position, and the first surface configured to contact the latch in a locked position;

moving a ball along a path through the halyard lock, the ball being operably connected to the halyard;

receiving the ball in the latch, the ball being impeded from further movement, such that the halyard is tensioned in the locked position; and releasing the latch from the locked position.

18. The method of claim 17, wherein a surface of the latch engages the ball as the ball moves along the path through the halyard lock.

19. The method of claim 17, further comprising a step of:

applying a tension force to pull the ball away from the locked position, which occurs prior to the step of releasing the latch from the locked position.

20. The method of claim 17, further comprising a step of:

rotating the latch to a neutral position in which the latch protrudes into the path, which occurs after the releasing step.

* * * * *